(12) United States Patent
Kawata

(10) Patent No.: US 9,120,157 B2
(45) Date of Patent: Sep. 1, 2015

(54) NC LATHE AND ACCESSORY

(75) Inventor: Yasuyuki Kawata, Kyoto (JP)

(73) Assignee: KAWATA CHUCK MANUFACTURING CO., LTD., Kyoto (JP)

( * ) Notice: Subject to any disclaimer, the term of this patent is extended or adjusted under 35 U.S.C. 154(b) by 159 days.

(21) Appl. No.: 13/876,056

(22) PCT Filed: Sep. 27, 2011

(86) PCT No.: PCT/JP2011/072055
§ 371 (c)(1),
(2), (4) Date: Mar. 26, 2013

(87) PCT Pub. No.: WO2012/043551
PCT Pub. Date: Apr. 5, 2012

(65) Prior Publication Data
US 2013/0305890 A1  Nov. 21, 2013

(30) Foreign Application Priority Data
Oct. 1, 2010  (JP) ................................ 2010-224086

(51) Int. Cl.
| | | |
|---|---|---|
| B23B 5/00 | (2006.01) | |
| B23B 29/32 | (2006.01) | |
| B23B 29/24 | (2006.01) | |
| B23Q 16/06 | (2006.01) | |
| B23B 3/16 | (2006.01) | |
| B23B 3/00 | (2006.01) | |

(52) U.S. Cl.
CPC ................ *B23B 29/323* (2013.01); *B23B 3/16* (2013.01); *B23B 29/242* (2013.01); *B23Q 16/06* (2013.01); *Y10T 82/2506* (2015.01)

(58) Field of Classification Search
CPC ......... B23Q 5/045; B23Q 16/04; B23Q 16/10
USPC ................................................. 82/121; 29/36
See application file for complete search history.

(56) References Cited

U.S. PATENT DOCUMENTS

| | | | | |
|---|---|---|---|---|
| 3,355,797 | A * | 12/1967 | Lohneis | 483/66 |
| 5,020,201 | A * | 6/1991 | Kitamura | 29/27 C |
| 6,651,535 | B2 * | 11/2003 | Hafla et al. | 82/121 |
| 6,716,146 | B2 * | 4/2004 | Kato | 483/58 |
| 7,117,773 | B2 * | 10/2006 | Katoh et al. | 82/121 |
| 8,631,727 | B2 * | 1/2014 | Nakagawa | 82/118 |
| 8,707,528 | B2 * | 4/2014 | Ozdyk et al. | 29/27 C |
| 8,720,311 | B2 * | 5/2014 | Sheehy et al. | 82/121 |
| 2001/0032532 | A1 * | 10/2001 | Hafla et al. | 82/117 |
| 2004/0003690 | A1 * | 1/2004 | Katoh et al. | 82/121 |
| 2008/0178718 | A1 * | 7/2008 | Kuo | 82/121 |

(Continued)

FOREIGN PATENT DOCUMENTS

| | | |
|---|---|---|
| JP | 63-039752 | 2/1988 |
| JP | 110406/1990 | 9/1990 |

(Continued)

*Primary Examiner* — Will Fridie, Jr.
(74) *Attorney, Agent, or Firm* — Kirschstein, et al.

(57) ABSTRACT

It is intended to provide an NC lathe which can increase the number of tools to be exchanged. A turret 1 and an additional turret 2 are combined with each other. The turret 1 has a plurality of mounting positions. The additional turret 2 is supported at one of the mounting positions. The additional turret 2 has a plurality of additional mounting positions. Tools 4 are mounted at the additional mounting positions, a work 4 being held by the chuck 8.

1 Claim, 5 Drawing Sheets

(56) References Cited

U.S. PATENT DOCUMENTS

2012/0152069 A1\* 6/2012 Hyatt et al. ............... 82/1.11
2013/0032012 A1\* 2/2013 Baumann et al. ........... 82/121
2014/0251097 A1\* 9/2014 Walz et al. ................. 82/121

FOREIGN PATENT DOCUMENTS

| JP | 2000-198047 | 7/2000 |
| JP | 2000-296441 | 10/2000 |
| JP | 2001-259969 | 9/2001 |

\* cited by examiner

NC LATHE AND ACCESSORY

FIELD OF THE INVENTION

The invention relates to an NC Lathe and an accessory.

BACKGROUND

Each of Japanese Laid-Open Patent Publications Nos. 2000-198047 and 2001-038502 discloses an NC lathe in which tools are mounted on a turret while a work is held by a chuck. The chuck is rotated about a drive shaft. The turret or the chuck is moved by an NC device in a direction of X-axis and a direction of Z-axis to machine the work with the tool.

In addition, the turret has a plurality of mounting positions. The turret is rotated about a support shaft, the mounting positions being spaced from each other equiangularly about the support shaft. Tools are mounted at the mounting positions. A motor is connected to the turret, the turret being rotated by the motor, so that the tool can be exchanged for another by the turret. In the NC lathe, under the recent sophistication of machining, it is required to increase the number of tools to be exchanged.

By the way, Japanese Patent Publication No. 3571605 discloses an index apparatus of push bar type for a machining center. Speaking just for reference with the knowledge of no direct relationship with the NC lathe, the machining center includes an NC device by which a spindle or a main table is moved to machine a work with a tool. In addition, the spindle or the main table is moved by the NC device independently of machining to make a push bar moved longitudinally thereof, an index table being rotated in response to the push bar to index the work.

It is therefore an object of the invention to provide an NC lathe which can increase the number of tools to be exchanged.

SUMMARY OF THE INVENTION

According to the invention, the NC lathe includes a turret having a plurality of mounting positions. The turret is rotated about a support shaft, the mounting positions being spaced from each other equiangularly about the support shaft. An additional turret is supported at one of the mounting positions. The additional turret has a plurality of additional mounting positions. The additional turret is rotated about an additional support shaft, the additional mounting positions being spaced from each other equiangularly about the additional support shaft. In addition, tools are mounted at the additional mounting positions. A chuck is rotated about a drive shaft, a work being held by the chuck. The NC lathe further includes an NC device by which the turret or the chuck is moved in a direction of x-axis and a direction of Z-axis to machine the work with the tool. The tool is exchanged for another by the turret and the additional turret.

In a preferred embodiment, the additional turret and a push bar are supported by a housing mounted at one of the mounting positions, the push bar being movable longitudinally thereof. The turret or the chuck is moved by the NC device independently of machining to make the push bar moved longitudinally thereof. A transmission device is received in the housing and interposed between the push bar and the additional turret to make the additional turret rotated in response to the push bar.

The invention further provides an accessary of NC lathe. The accessary includes a housing to be mounted on a turret rotated about a support shaft. An additional turret is supported by the housing. The additional turret has a plurality of additional mounting positions. The additional turret is rotated about an additional support shaft, the additional mounting positions being spaced from each other equiangularly about the additional support shaft. A push bar is supported by the housing for movement longitudinally of the push bar. A transmission device is received in the housing and interposed between the push bar and the additional turret to make the additional turret rotated in response to the push bar. Tools are mounted at the additional mounting positions to be exchanged for another by the additional turret.

BEST MODE TO CARRY OUT THE INVENTION

Embodiments of the invention are as follows.

Figure 1:
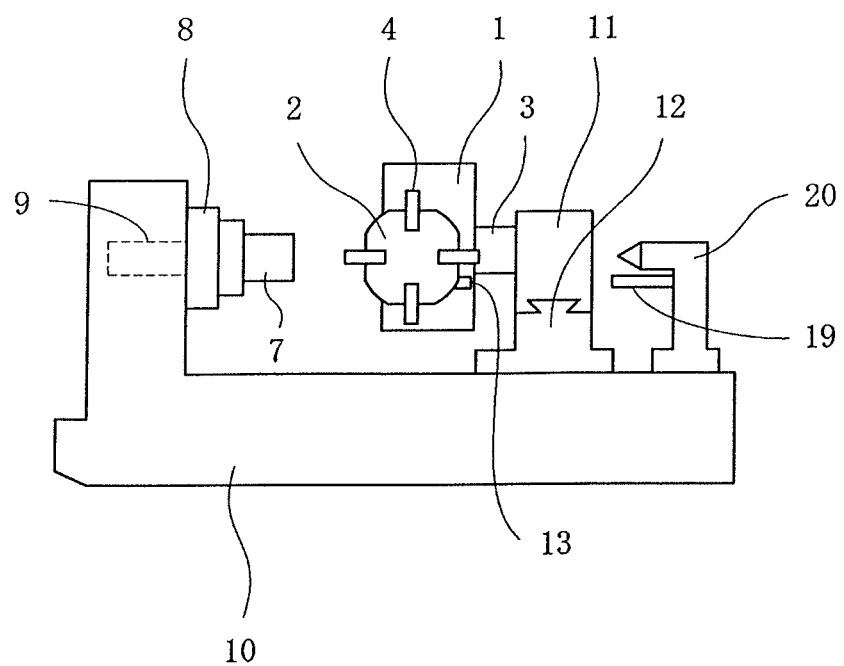
FIG. 1 is a side view illustrating a preferred embodiment of the invention.
Figure 2:
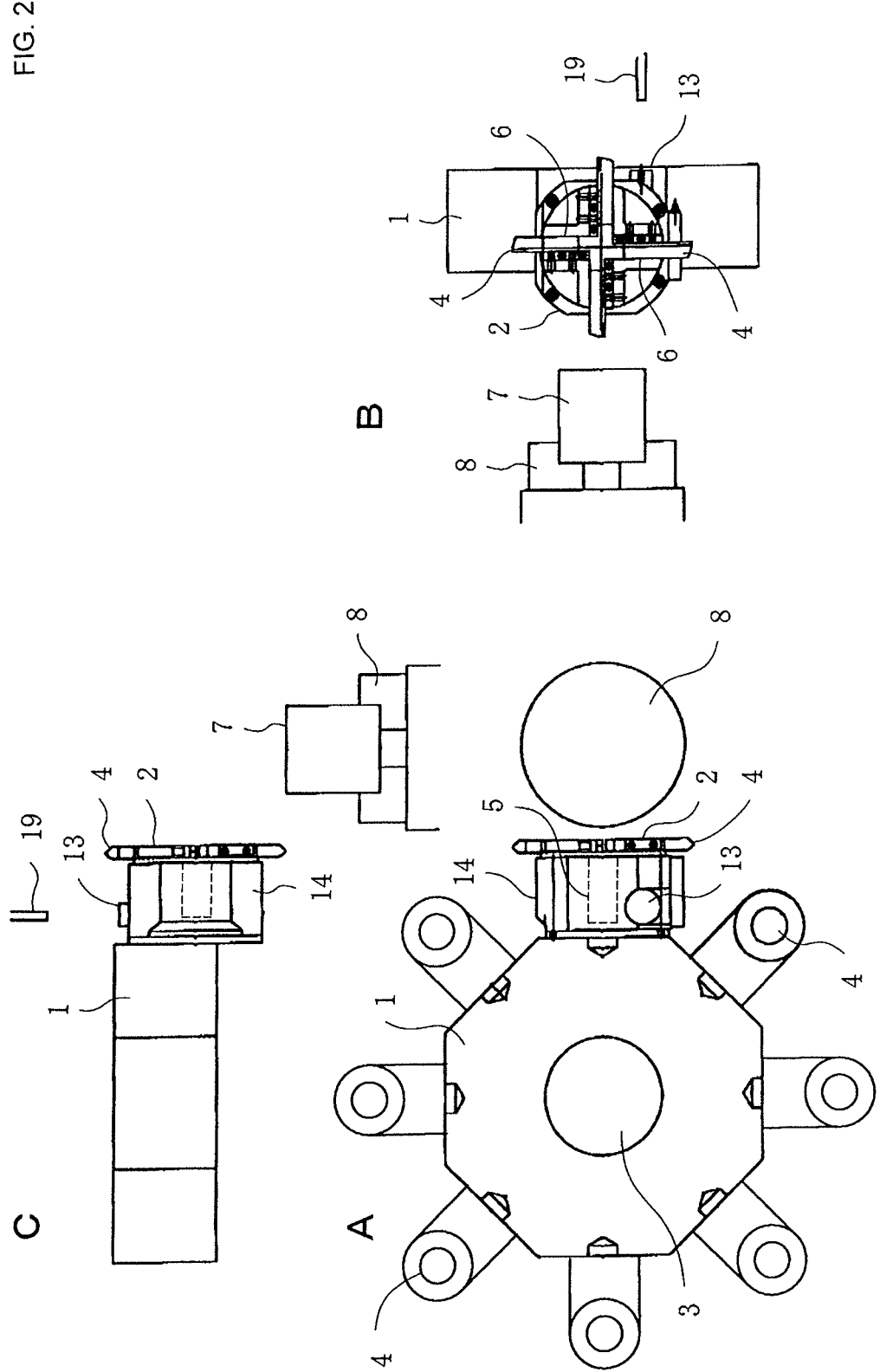
FIG. 2 is an elevational view (A), a side view (B) and a plan view (C) of the turret and the additional turret of FIG. 1.

Turning now to the drawings, FIG. 1 illustrates an NC lathe including a turret 1 and an additional turret 2, according to the invention. The turret 1 has a plurality of mounting positions, as shown in FIG. 2. The turret 1 is rotated about a support shaft 3, the mounting positions being spaced from each other equiangularly about the support shaft 3. The additional turret 2 is supported at one of the mounting positions. In the embodiment, the turret 1 is octagonal having eight sides at each of which the mounting position is predetermined. The turret 2 has therefore eight mounting positions at one of which the additional turret 2 is supported. Tools 4 are mounted at other mounting positions.

The additional turret 2 has a plurality of additional mounting positions. The additional turret 2 is rotated about an additional support shaft 5, the additional mounting positions being spaced from each other equangularly about the additional support shaft 5. In addition, tools 4 are mounted at the additional mounting positions. In the embodiment, the additional turret 2 has four additional mounting positions at each of which the tool 4 is inserted in and mounted by a recess 6 formed in the additional turret 2.

In order to machine a work 7, a chuck 8 is rotated about a drive shaft 9, the work 7 being held by the chuck 8. For example, the chuck 8 is fixed to the drive shaft 9. A motor is connected to the drive shaft 9 to make the chuck 8 and the work 7 rotated. The drive shaft 9 and the motor are supported by a bed 10.

On the other hand, the turret 1 and the support shaft 3 are supported by a saddle 11 which is supported by a frame 12 for movement in a direction of X-axis. The frame 12 is supported by the bed 10 for movement in a direction of Z-axis. The direction of X-axis means a direction predetermined radially of the drive shaft 9 while the direction of Z-axis means a direction predetermined axially of the drive shaft 9. In addition, a motor is supported by the frame 12 and connected to a feed screw which is engaged threadedly with the saddle 11 so that the saddle 11 can be moved by the motor in the direction of X-axis. A motor is supported by the bed 10 and connected to a feed screw which is engaged threadedly with the frame 12 so that the frame 12 can be moved by the motor in the direction of Z-axis. The NC lathe includes an NC device connected to the motors to control them. The turret 1 is therefore moved by the NC device in the direction of X-axis and the direction of Z-axis so that the tool 4 can be engaged with the work 7 to machine the work 7 with the tool 4.

Furthermore, the turret 1 is fixed to the support shaft 3, a motor being supported by the saddle 11 and connected to the support shaft 3, so that the turret 1 and the support shaft 3 can be rotated by the motor about the support shaft 3. In addition, the NC device is connected to the motor to control it so that the turret 1 can be rotated at an angle predetermined. The tool 4 is therefore exchanged for another by the turret 1.

In the NC lathe, the additional turret 2 and a push bar 13 are supported by a housing 14 mounted at one of the mounting positions, the push bar 13 being movable longitudinally thereof. The turret 1 is moved by the NC device independently of machining to make the push bar 13 moved longitudinally thereof. A transmission device is received in the housing 14 and interposed between the push bar 13 and the additional turret 2 to make the additional turret 2 rotated in response to the push bar 13.

Figure 3:
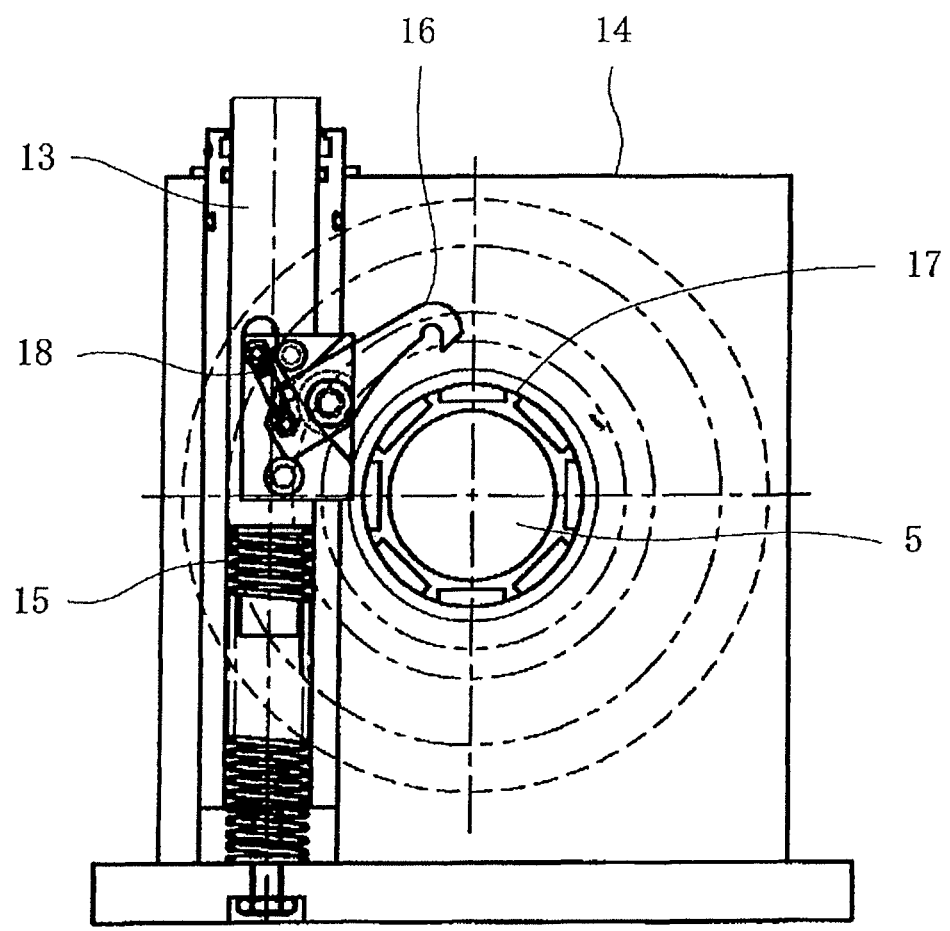
FIG. 3 is a sectional view of the push bar and the transmission device of FIG. 1.

In the embodiment, the additional turret 2 is fixed to the additional support shaft 5 supported by the housing 14 for rotation. The additional turret 2 is therefore supported by the housing 14 and the additional support shaft 5, the housing 14 being mounted on the turret 1. The push bar 13 is supported by the housing 14 for movement and urged resiliently by a spring 15, as shown in FIG. 3 and as in the case of the push bar and the transmission device of Japanese Patent Publication No. 3,571,605. The additional support shaft 5 extends in the direction of X-axis. The push bar 13 extends in the direction of Z-axis to be moved longitudinally thereof. The transmission device includes a pawl 16 and a ratchet wheel 17. The pawl 16 is mounted on the push bar 13 and urged resiliently by a spring 18 while the ratchet wheel 17 is fixed to the additional support shaft 5. The ratchet wheel 17 is coaxial with the additional support shaft 5.

The NC lathe further includes a stop, the bed 10 being provided with the stop. In the embodiment, the stop comprises a rod 19 extending in the direction of Z-axis. The rod 19 is disposed at a position corresponding to the push bar 13 in a direction of Y-axis. The direction of Y-axis means a direction vertical to the direction of X-axis and the direction of Z-axis. The bed 10 is provided with a tailstock 20, the rod 19 being mounted on the tailstock 20. The tailstock 20 is known and intended to be pressed against the work 7 which is long.

In the NC lathe, the turret 1 is moved by the NC device in the direction of X-axis when the additional turret 2 is disposed at a position predetermined angularly about the support shaft 3 so that the push bar 13 can be moved integrally with the turret 1 and the additional turret 2 into a position corresponding to the rod 19. The turret 1 is then moved by the NC device in the direction of Z-axis so that the push bar 13 can be moved toward and pressed against the rod 19. The push bar 13 is therefore moved by the rod 19, the pawl 16 being engaged with the ratchet wheel 17, so that the ratchet wheel 17, the additional support shaft 5 and the additional turret 2 can be rotated by the pawl 16 and the spring 18. The push bar 13 is then retracted from the rod 19 to be moved and returned by the spring 15. Subsequently, the push bar 13 is pressed against and retracted from the rod 19 once more to make the additional turret 2 rotated once more. The push bar 13 is pressed against and retracted from the rod 19 again and again to make the additional turret 2 rotated at an angle predetermined so that the tool 4 can be exchanged for another by the additional turret 2.

It should be understood that the turret 1 is then moved by the NC device in the direction of X-axis and the direction of Z-axis so that the tool 4 can be engaged with the work 7 to machine the work 7 with the tool 4.

The NC lathe can therefore increase the number of tools 4 to be exchanged. In the embodiment, the additional turret 2 has four additional mounting positions at each of which the tool 4 is mounted respectively, as described previously. The turret 1 has eight mounting positions at one of which the additional turret 2 is supported so that the tool 4 can be mounted at each of seven mounting positions. In the NC lathe, eleven tools 4 can therefore be mounted to be exchanged, in total (4+7).

The additional turret 2 may be supported at each of two of eight mounting positions of the turret 1. In this case, 14 tools 4 can be mounted to be exchanged, in total (4×2+6). The additional turret 2 may be supported at each of eight mounting positions. In this case, 32 tools 4 can be mounted to be exchanged, in total (4×8).

In addition, the NC lathe can be arranged by using an existing NC lathe without change. In this case, it is preferable to make and distribute a number of accessories each of which comprises the housing 14, the additional turret 2, the push bar 13 and the transmission device. The housing 14 should be mounted on and fixed to the turret 1, in the existing NC lathe. In addition, the rod 19 is mounted on the tailstock 20. The NC lathe has therefore not to be remodeled drastically.

Regarding the number of mounting positions and additional mounting positions, the turret 1 may have more or less than eight mounting positions. The additional turret 2 may have more or less than four additional mounting positions.

The rod 19 has not always to be mounted on the tailstock 20. The rod 19 may be mounted on and supported by the bed 10 directly. The stop may have a shape other than the rod 19.

In order to machine the work 7 with the tool 4, the turret 1 has not always to be moved by the NC device in the direction of X-axis and the direction of Z-axis. Not the turret 1 but the chuck 8 may be moved by the NC device in the direction of X-axis and the direction of Z-axis so that the tool 4 can be engaged with the work 7 to machine the work 7 with the tool 4. In this case, the chuck 8 may be moved by the NC device so that the rod 19 can be moved by the chuck 8 to make the additional turret 2 rotated, the tool 4 being exchanged for another by the additional turret 2.

Figure 4:
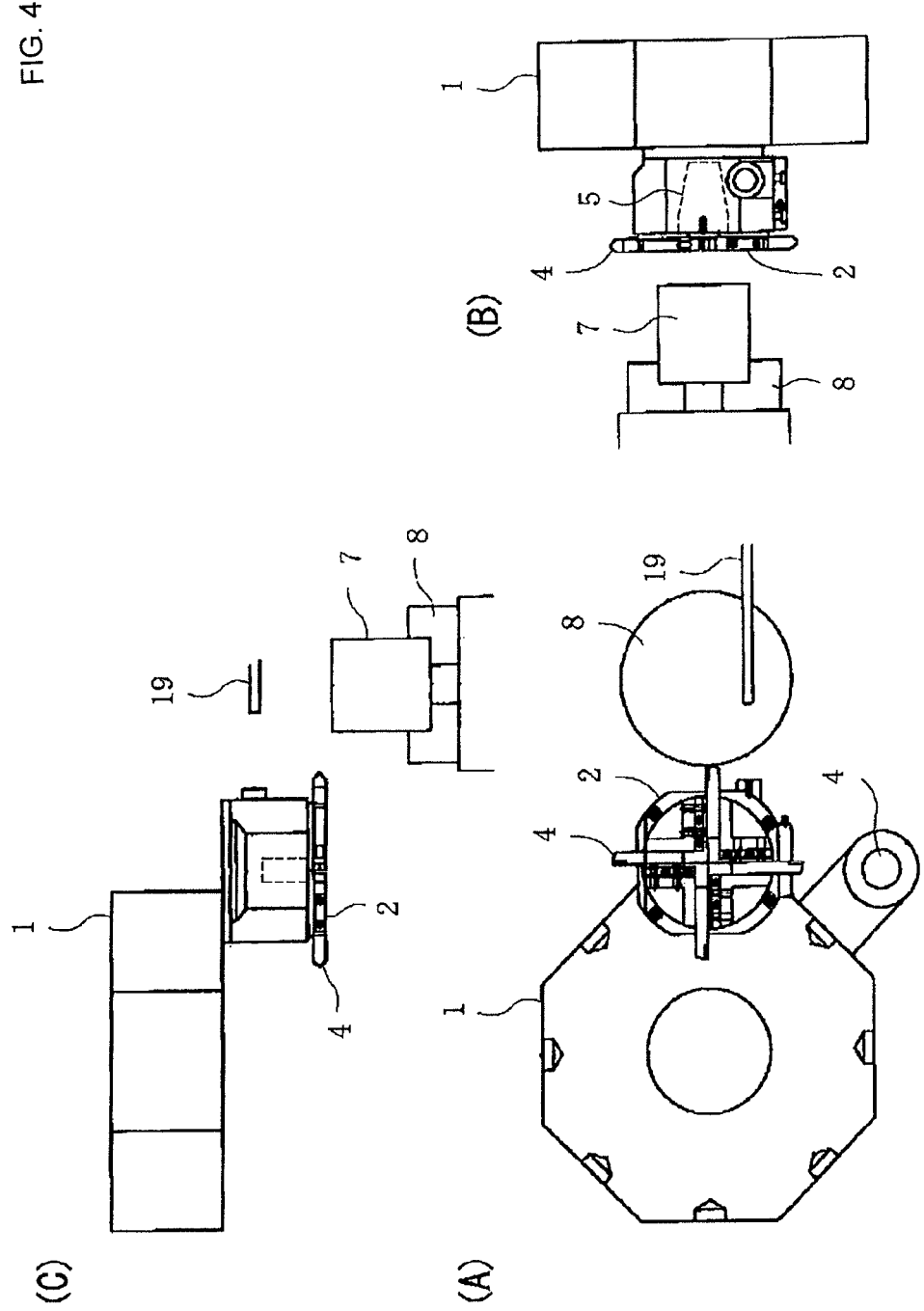
FIG. 4 is an elevational view (A), a side view (B) and a plan view (C) of another embodiment.

In another embodiment of FIG. 4 in which the turret 1 has a plurality of mounting positions at one of which the additional turret 2 is mounted, the additional support shaft 5 extends not in the direction of X-axis but in the direction of Z-axis. On the other hand, the rod 19 extends not in the direction of Z-axis but in the direction of X-axis. The turret 1 or the chuck 8 should therefore be moved by the NC device in the direction of Z-axis so that the push bar 13 or the rod 19 can be moved to make them disposed at positions corresponding to each other. The turret 1 or the chuck 8 is then moved by the NC device in the direction of X-axis so that the push bar 13 or the rod 19 can be moved to make the additional turret 2 rotated, the tool 4 being exchanged for another.

Figure 5:
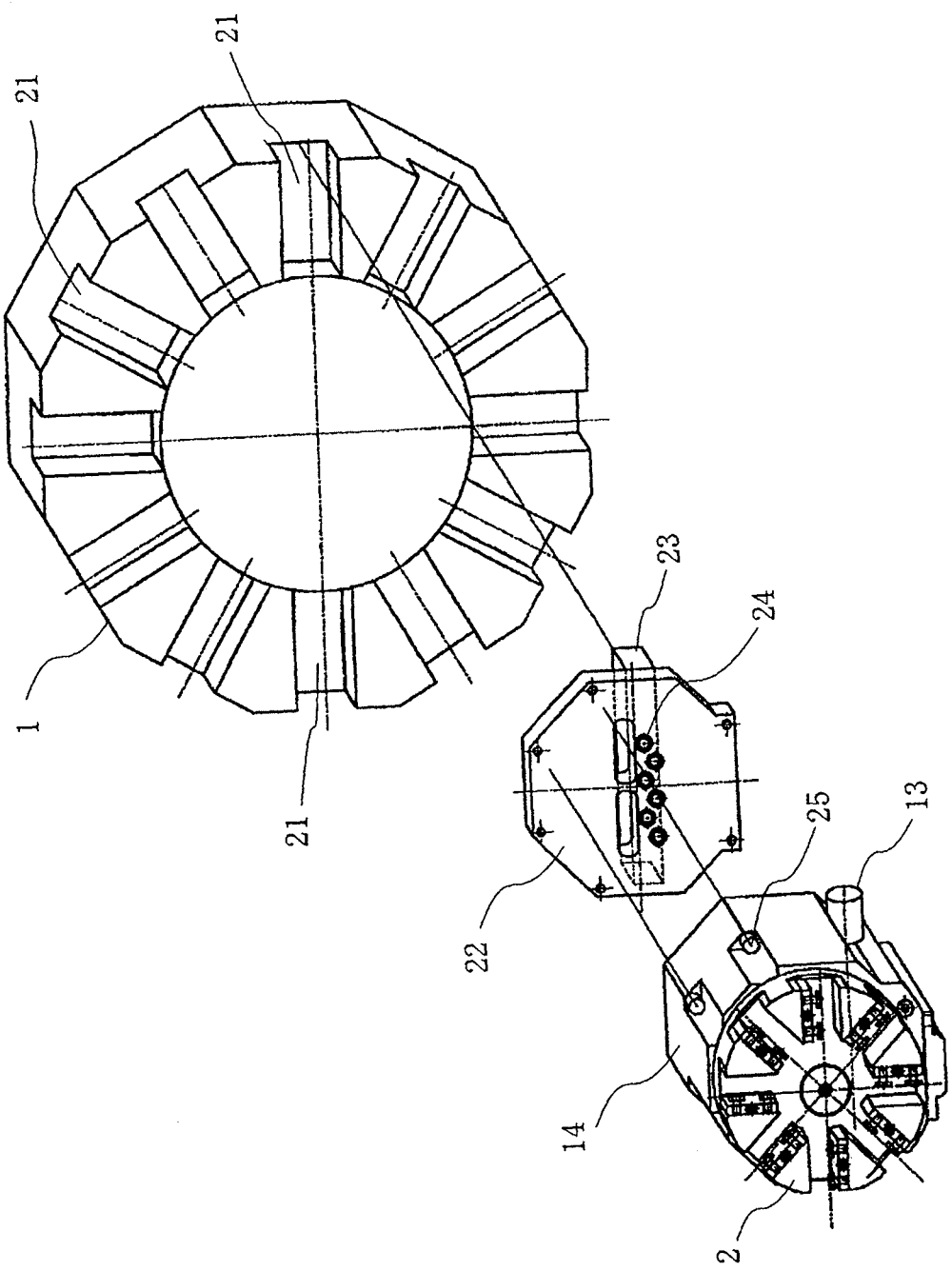
FIG. 5 is a perspective view of another embodiment.

In another embodiment of FIG. 5 in which the turret 1 has a plurality of mounting positions, the turret 1 includes grooves 21 formed therein at the mounting positions. The tools are mounted by utilizing the grooves 21. The additional turret 2 and the push bar 13 are supported by the housing 14, the transmission device being received in the housing 14 and interposed between the push bar 13 and the additional turret 2, as in the case of the previous embodiments. The accessory comprises the housing 14, the additional turret 2, the push bar 13 and the transmission device. In addition, in the embodiment of FIG. 5, an adaptor 22 is mounted on the turret 1 when the housing 14 is mounted on the turret 1. For example, a key 23 is formed on the adaptor 22 and fitted into the groove 21 at the mounting position of the turret 1 so that the adaptor 22 can be mounted and fixed by screws 24. The housing 14 is then mounted on the adaptor 22. For example, the housing 14 is mounted and fixed by screws 25. It should therefore be understood that the housing 14 is mounted on the turret 1 by the adaptor 22 and the screws 23 and 25.

What is claimed is:

1. A numerically controlled (NC) lathe, comprising:

a turret having a plurality of mounting positions and rotated about a support shaft, the mounting positions being spaced from each other equiangularly about the support shaft;

a housing mounted at one of the mounting positions;

an additional turret supported by the housing and having a plurality of additional mounting positions and rotated about an additional support shaft having a longitudinal axis, the additional mounting positions being spaced from each other equiangularly about the additional support shaft;

tools mounted at the additional mounting positions and including cutting edges, the tools having longitudinal axes extending radially of the additional turret, the cutting edges protruding outwardly of the additional turret and the housing;

a chuck rotated about a drive shaft;

a work piece held by the chuck;

a push bar having a longitudinal axis extending along a plane vertical to the longitudinal axis of the additional support shaft, the push bar being received in and supported by the housing for movement longitudinal along the longitudinal axis of the push bar, the push bar extending outwardly of the housing without protruding beyond the cutting edges;

a stop comprising a rod;

an NC device by which the turret is moved in a direction of an X-axis and in a direction of a Z-axis so that the cutting edges can be engaged with the work piece to machine the work piece with the cutting edges, the turret being moved by the NC device independently of machining so that the push bar can be butted against the rod to make the push bar move relatively to the additional turret; and a transmission device received in the housing and interposed between the push bar and the additional turret to make the additional turret rotate in response to the push bar, each tool being exchanged for another by the turret and the additional turret.

* * * * *